(12) United States Patent
Yamaguchi et al.

(10) Patent No.: US 9,426,507 B2
(45) Date of Patent: Aug. 23, 2016

(54) INFORMATION RECOMMENDATION DEVICE, INFORMATION RECOMMENDATION SYSTEM, AND INFORMATION RECOMMENDATION METHOD

(71) Applicant: PANASONIC CORPORATION, Osaka (JP)

(72) Inventors: Koichiro Yamaguchi, Osaka (JP); Hiroki Shinohara, Kyoto (JP); Ken-Ichi Shibata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 122 days.

(21) Appl. No.: 14/452,065

(22) Filed: Aug. 5, 2014

(65) Prior Publication Data

US 2014/0344840 A1 Nov. 20, 2014

Related U.S. Application Data

(63) Continuation of application No. PCT/JP2012/008422, filed on Dec. 28, 2012.

(30) Foreign Application Priority Data

Feb. 9, 2012 (JP) .................................. 2012-025776

(51) Int. Cl.
*H04N 21/25* (2011.01)
*H04N 21/482* (2011.01)
*H04N 5/445* (2011.01)

(52) U.S. Cl.
CPC .......... *H04N 21/252* (2013.01); *H04N 21/4826* (2013.01); *H04N 2005/44569* (2013.01)

(58) Field of Classification Search
None
See application file for complete search history.

(56) References Cited

U.S. PATENT DOCUMENTS

| 7,085,761 B2 | 8/2006 | Shibata |
| 7,277,859 B2 | 10/2007 | Watanabe et al. |
| 2003/0120495 A1 | 6/2003 | Watanabe et al. |

(Continued)

FOREIGN PATENT DOCUMENTS

| JP | 2001-298677 A | 10/2001 |
| JP | 2001-352308 A | 12/2001 |

(Continued)

OTHER PUBLICATIONS

International Search Report issued in PCT/JP2012/008422, dated Apr. 9, 2013, with English translation.

*Primary Examiner* — Omar S Parra
(74) *Attorney, Agent, or Firm* — McDermott Will & Emery LLP

(57) ABSTRACT

An information recommendation device includes: a first evaluation unit which calculates, for each of a plurality of content items being broadcasted, a first evaluation value which is defined depending on a user; a second evaluation unit which calculates, for each of the content items, a second evaluation value which is defined based on a current reaction of public toward the content item; and a recommended program determination unit which determines a recommended content item based on the first evaluation value calculated by the first evaluation unit and the second evaluation value calculated by the second evaluation unit, the recommended content item being a content item recommended to the user for viewing.

10 Claims, 10 Drawing Sheets

(56) References Cited

U.S. PATENT DOCUMENTS

| | | |
|---|---|---|
| 2004/0002945 A1 | 1/2004 | Shibata |
| 2004/0049788 A1 | 3/2004 | Mori et al. |
| 2010/0088727 A1* | 4/2010 | Jensen .............. G06F 17/30964 725/46 |
| 2010/0251302 A1 | 9/2010 | Chao et al. |
| 2015/0195624 A1* | 7/2015 | Gossweiler, III .. H04N 21/4826 725/40 |

FOREIGN PATENT DOCUMENTS

| | | |
|---|---|---|
| JP | 2002-290996 A | 10/2002 |
| JP | 2004-030526 A | 1/2004 |
| JP | 2004-129245 A | 4/2004 |
| JP | 2004-200733 A | 7/2004 |
| JP | 2009-134633 A | 6/2009 |
| JP | 2010-039533 A | 2/2010 |
| JP | 4732815 B2 | 7/2011 |
| JP | 2011-223571 A | 11/2011 |

* cited by examiner

FIG. 7

|  | Program A | Program B | Difference between program A and program B |
|---|---|---|---|
| Viewing-history-recommendation keyword matching count | 9 | 3 | 0.5 |
| Rating | 0.6 | 0.4 | 0.2 |
| Internet post count | 50 posts / minute | 100 posts / minute | 50 posts / minute |

FIG. 8

|  | Program A | Program B | Difference between program A and program B |
|---|---|---|---|
| Viewing-history-recommendation keyword matching count | 9 | 3 | 0.5 |
| Rating | 0.25 | 0.75 | 0.5 |
| Internet post count | 50 posts / minute | 100 posts / minute | 50 posts / minute |

FIG. 9

|  | Program A | Program B | Difference between program A and program B |
|---|---|---|---|
| Viewing-history-recommendation keyword matching count | 9 | 3 | 0.5 |
| Rating | 0.4 | 0.6 | 0.2 |
| Internet post count | 50 posts / minute | 100 posts / minute | 50 posts / minute |

FIG. 10

|  | Program A | Program B | Difference between program A and program B |
|---|---|---|---|
| Viewing-history-recommendation keyword matching count | 5 | 3 | 0.25 |
| Rating | 0.6 | 0.4 | 0.2 |
| Internet post count | 100 posts / minute | 10 posts / minute | 90 posts / minute |

FIG. 11

| | Program A | Program B | Difference between program A and program B |
|---|---|---|---|
| Viewing-history-recommendation keyword matching count | 5 | 3 | 0.25 |
| Rating | 0.4 | 0.6 | 0.2 |
| Internet post count | 100 posts / minute | 10 posts / minute | 90 posts / minute |

FIG. 12

| | Program A | Program B | Difference between program A and program B |
|---|---|---|---|
| Viewing-history-recommendation keyword matching count | 5 | 3 | 0.25 |
| Rating | 0.4 | 0.6 | 0.2 |
| Internet post count | 10 posts / minute | 100 posts / minute | 90 posts / minute |

| | Program A | Program B | Difference between program A and program B |
|---|---|---|---|
| Viewing-history-recommendation keyword matching count | 5 | 3 | 0.25 |
| Rating | 0.25 | 0.75 | 0.5 |
| Internet post count | 100 posts / minute | 10 posts / minute | 90 posts / minute |

INFORMATION RECOMMENDATION DEVICE, INFORMATION RECOMMENDATION SYSTEM, AND INFORMATION RECOMMENDATION METHOD

CROSS REFERENCE TO RELATED APPLICATION

This is a continuation application of PCT International Application No. PCT/JP2012/008422 filed on Dec. 28, 2012, designating the United States of America, which is based on and claims priority of Japanese Patent Application No. 2012-025776 filed on Feb. 9, 2012. The entire disclosures of the above-identified applications, including the specifications, drawings and claims are incorporated herein by reference in their entirety.

FIELD

The present disclosure relates to an information recommendation device, an information recommendation system, an information recommendation method, and a program.

BACKGROUND

Patent Literature (PTL) 1 (Japanese Patent No. 4732815) discloses a technique for providing information appropriate for the user by learning the user's preference from the user's information viewing history (viewing history of broadcast program, for example).

Furthermore, PTL 2 (Japanese Unexamined Patent Application Publication No. 2001-298677) discloses a technique for proposing not only a recommended program based on the history information but also a recommended program obtained by grouping people who have slimier preference and determining a program viewed by the greatest number of people out of the programs viewed by the people in the same group.

SUMMARY

The present disclosure provides an information recommendation device and so on which determine, in real time, content recommended to the user for viewing.

An information recommendation device according to the present disclosure includes: a first evaluation unit configured to calculate, for each of a plurality of content items being broadcasted, a first evaluation value which is defined depending on a user; a second evaluation unit configured to calculate, for each of the content items, a second evaluation value which is defined based on a current reaction of public toward the content item; and a recommended program determination unit configured to determine a recommended content item based on the first evaluation value calculated by the first evaluation unit and the second evaluation value calculated by the second evaluation unit, the recommended content item being a content item recommended to the user for viewing.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 7 illustrates Example 1 of the program recommendation.

FIG. 8 illustrates Example 2 of the program recommendation.

FIG. 9 illustrates Example 3 of the program recommendation.

FIG. 10 illustrates Example 4 of the program recommendation.

FIG. 11 illustrates Example 5 of the program recommendation.

FIG. 12 illustrates Example 6 of the program recommendation.

DESCRIPTION OF EMBODIMENT

Figure 1:
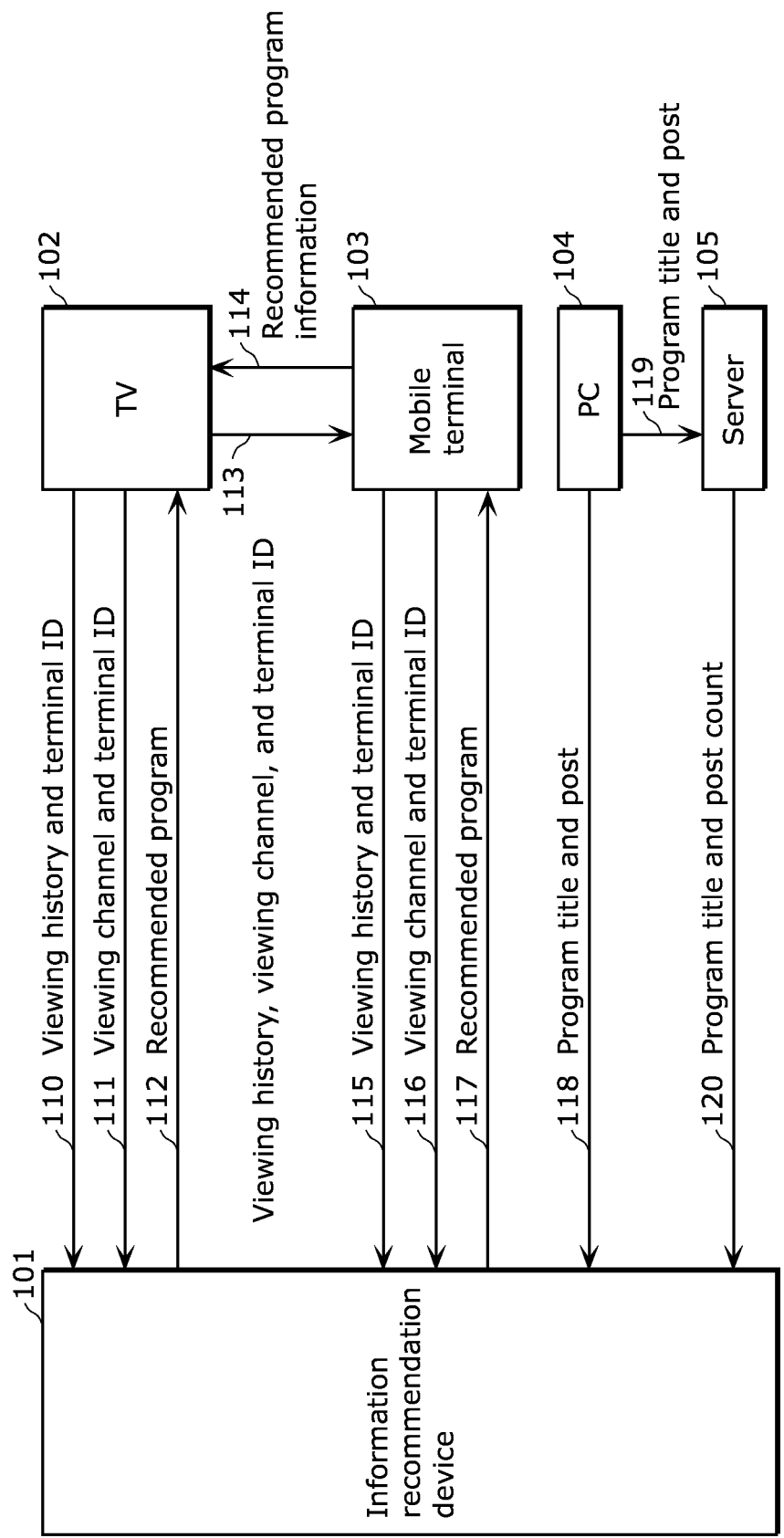
FIG. 1 illustrates a configuration of an entire system that includes an information recommendation device.

With an information recommendation device according to the present disclosure, content recommended to a user for viewing can be determined in real time.

The following describes the embodiments in detail with reference to the Drawings as necessary. However, description detailed beyond necessity is omitted in some cases. For example, detailed description on an already well-known matter or overlapped description on substantially the same structures may be omitted. This is for avoiding unnecessary redundancy in the description below, and for making it easier for those skilled in the art to understand.

It is to be noted that the inventors provide the attached Drawings and the description below to help those skilled in the art understand the present disclosure sufficiently, and thus it should not be construed that the scope of Claims is limited to the Drawings and description.

Firstly, description shall be provided on the issues solved by the present disclosure.

Recent years have seen diversification of information. In such a situation, services are provided for informing the user of a recommended program (a program recommended to the user for viewing) out of the variety of information. In such services, a technique is used in which a cycle of viewing which can be obtained from the user's viewing history and keyword matching are used.

PTL 1 discloses a technique for providing information appropriate for the user by learning the user's preference from the user's information viewing history (viewing history of broadcast program, for example).

Furthermore, PTL 2 discloses a technique for proposing not only a recommended program based on the history information but also a recommended program obtained by grouping people who have slimier preference and determining a program viewed by the greatest number of people out of the programs viewed by the people in the same group.

However, in the technique disclosed in PTL 1, the content of the program is not actually checked and the recommendation is provided based on the program information obtained in advance. Therefore, the recommendation may be inept in the case of an urgent program change and so on.

Furthermore, the method disclosed in PTL 2 simply recommends a program having the highest rating at the time, and is insufficient as a service for providing recommended programs.

The present disclosure provides an information recommendation device and so on which determine, in real time, content recommended to the user for viewing.

An information recommendation device according to the present disclosure includes: a first evaluation unit configured to calculate, for each of a plurality of content items being broadcasted, a first evaluation value which is defined depending on a user; a second evaluation unit configured to calculate, for each of the content items, a second evaluation value which is defined based on a current reaction of public toward the content item; and a recommended program determination unit configured to determine a recommended content item based on the first evaluation value calculated by the first evaluation unit and the second evaluation value calculated by the second evaluation unit, the recommended content item being a content item recommended to the user for viewing.

With this, the recommended content item (program) to the user can be determined based on the first evaluation value and the second evaluation value. If the recommended content item is to be determined based only on the first evaluation value defined from the information related to the user, a correct recommended content item cannot be determined in the case where the scheduled broadcast time of the content item is changed. Since the second evaluation value is also used in the present disclosure, the recommended content item can be determined correctly even when the scheduled broadcast time of the content item is changed. The second evaluation value is the value obtained taking into account the current reaction of public toward the content item.

In addition, even when there is no change in the broadcast time of the content item, the viewing status varies in the broadcast time depending on the broadcast content. In the present disclosure, the information dependent on the current viewing status of the viewer who is actually viewing the content item is used, which allows correctly determining the recommended content item. Thus, the information recommendation device can determine, in real time, the content item recommended to the user for viewing (recommended content item).

Furthermore, for example, the first evaluation unit is configured to calculate, for each of the content items, the first evaluation value to be greater as relevance between the content item and a preference of the user or a past viewing history of the user is higher.

With this, the information recommendation device uses, as the information defined depending on the user, information indicating the user's preference or information on the user's past viewing history. Then, the information recommendation device calculates the first evaluation value by comparing the above information with information indicating the characteristics of the content item. Thus, it is possible to determine a recommended content item on which the user's preference is reflected more or a recommended content item which is closer to the user's viewing history.

Furthermore, for example, the second evaluation unit is configured to: calculate the second evaluation value using a current viewing status toward the content item as the reaction; select two or more of the content items based on the first evaluation value calculated by the first evaluation unit; and calculate, for each of the two or more of the content items, the second evaluation value to be greater as the number of viewers of the content item is greater.

With this, the information recommendation device selects two or more of the content items based on the first evaluation value (the content having the highest first evaluation value and the content item having the next highest first evaluation value, for example), and calculates the second evaluation value for the two or more content items. The second evaluation value is greater as the user and a large number of other viewers are viewing the content item. Thus, it is possible to determine, as the recommended content item, the content item being viewed by the greater number of viewers out of the recommended content items on which the user's preference are reflected more or the recommended content items which are closer to the user's viewing history.

Furthermore, for example, when (i) the first evaluation value calculated by the first evaluation unit for a first program is greater than, by a threshold or more, the first evaluation value calculated by the first evaluation unit for a second program, and (ii) the second evaluation value calculated by the second evaluation unit for the second program is not greater than the second evaluation value calculated by the second evaluation unit for the first program, the recommended program determination unit is configured to determine the first program as the recommended content item, the first program and the second program being included in the plurality of content items and being different from each other.

This allows more specifically determining, in real time, a content item recommended to the user for viewing (recommended content item) using the first evaluation value and the second evaluation value.

Furthermore, for example, the information recommendation device further includes a post count obtainment unit configured to obtain the number of posts posted to a server on the Internet related to the content items being broadcasted, and the recommended program determination unit is configured to determine the recommended content item based on the first evaluation value, the second evaluation value, and the post count obtained by the post count obtainment unit.

With this, the recommended content item can be determined taking into account the number of posts (post count) on the Internet. The internet post count varies drastically in the broadcast time depending on the broadcast content. The use of variation in the internet post count allows determining the recommended content item in real-time.

Furthermore, for example, when (i) the first evaluation value calculated by the first evaluation unit for a first program is not greater than, by a first threshold or more, the first evaluation value calculated by the first evaluation unit for a second program, (ii) the second evaluation value calculated by the second evaluation unit for the second program is not greater than, by a second threshold or more, the second evaluation value calculated by the second evaluation unit for the first program, and (iii) the post count of posts related to the first program while the first program is broadcasted is not greater than the post count of posts related to the second program while the second program is broadcasted, the recommended program determination unit is configured to determine the second program as the recommended content item, the first program and the second program being included in the plurality of content items and being different from each other.

This allows more specifically determining, in real time, the content item recommended to the user for viewing (recommended content item), using the first evaluation value, the second evaluation value, and the internet post count.

Furthermore, an information recommendation system according to the present disclosure includes: the above-described information recommendation device; and a content display terminal which displays a content item and transmits information dependent on a user viewing the content item to the information recommendation device, wherein the first evaluation unit of the information recommendation device is configured to calculate the first evaluation value based on the information dependent on the user and is received from the content display terminal.

With this, the same advantageous effect as that of the above information recommendation device is produced.

Furthermore, an information recommendation method according to an aspect of the present disclosure includes: calculating, for each of a plurality of content items being broadcasted, a first evaluation value which is defined depending on a user, the calculating being performed by a computer; calculating, for each of the content items, a second evaluation value which is defined based on a current reaction of public toward the content item, the calculating being performed by a computer; and determining a recommended content item based on the first evaluation value calculated in the calculating of a first evaluation value and the second evaluation value calculated in the calculating of a second evaluation value, the recommended content item being a content item recommended to the user for viewing, the calculating being performed by a computer.

With this, the same advantageous effect as that of the above information recommendation device is produced.

Furthermore, a non-transitory computer-readable recording medium according to an aspect of the present disclosure is a non-transitory computer-readable recording medium for use in a computer, the recording medium having the above computer program recorded thereon for causing the computer to execute the above information recommendation method.

With this, the same advantageous effect as that of the above information recommendation device is produced.

Embodiment

Embodiment 1 shall be described below with reference to FIGS. 1 to 14.

[1-1. Structure]

FIG. 1 illustrates a configuration of an entire system that includes an information recommendation device. As shown in FIG. 1, the system includes an information recommendation device 101, a TV 102, a mobile terminal 103, a PC 104, and a server 105.

The TV 102 is a TV which is viewed by the user of the information recommendation device 101. The TV 102 transmits viewing history 110 of a TV program on the TV 102 together with a terminal ID for identifying the TV 102, to the information recommendation device 101 via a communication network. The viewing history 110 is information related to the program viewed by the user, and includes the title, information on casts, a name of segment, and so on, of the program. The TV 102 is capable of transmitting the viewing history 110 to the information recommendation device 101, every time the program is switched. The TV 102 is also capable of collectively transmitting, to the information recommendation device 101, the viewing history 110 of plural programs per predetermined time period (one day, for example). Furthermore, the TV 102 transmits, to the information recommendation device 101, a viewing channel 111 of the TV 102 together with the terminal ID. The viewing channel is a channel the user is currently viewing. The TV 102 is capable of transmitting, to the information recommendation device 101, the viewing channel 111 every time the channel is switched. The TV 102 is also capable of transmitting, to the information recommendation device 101, the viewing channel 111 per predetermined time period (one minute, for example). It is to be noted that plural TV 102 may be included.

The mobile terminal 103 is easily-portable mobile terminal. When the TV 102 is large and is not suitable to be moved, the user can view TV programs and information transmitted from the information recommendation device 101 at hand, and can operate the TV 102, through the mobile terminal 103. The TV 102 may transmit the viewing history, the viewing channel (numeral 113 is assigned to both of the above), and the terminal ID to the mobile terminal 103, to cause the mobile terminal 103 to transmit the viewing history 115, viewing channel 116, and the terminal ID of the TV 102, to the information recommendation device 101. It is to be noted that plural mobile terminal 103 may be included.

The PC 104 is a personal computer (PC) which allows the user to post, via the Internet, reviews or critics on a TV program into a WEB site, etc. related to the program. The PC 104 transmits the posted information (program title, post 118) to the information recommendation device 101. Furthermore, the information (program title, post 119) posted through the PC 104 may be transmitted to the server 105. In this case, the server 105 collects the information (program title, post 119) posted through one or more PCs 104, and transmits the program of the post together with the post count 120 to the information recommendation device 101. A plurality of the PCs 104 and servers 105 may be included. Furthermore, the server 105 may transmit not the post count 120 but the post 119 itself, to the information recommendation device 101.

The above information transmission (110, 111, 115, 116, 118, 120) to the information recommendation device 101 does not have to be performed by the specific terminals (TV 102, mobile terminal 103, PC 104, or server 105) described in the embodiment, and may be performed by terminals of any form and type as long as information can be transmitted.

The information recommendation device 101 determines the recommended program (program recommended to the user for viewing) based on the information transmitted from the TV 102, the mobile terminal 103, the PC 104, and the server 105, and transmits the determined recommended program to the TV 102 and the mobile terminal 103 (112, 117). The recommended program can be viewed by the TV 102 by the mobile terminal 103 notifying the TV 102 of the transmitted recommended program (114).

Figure 2:
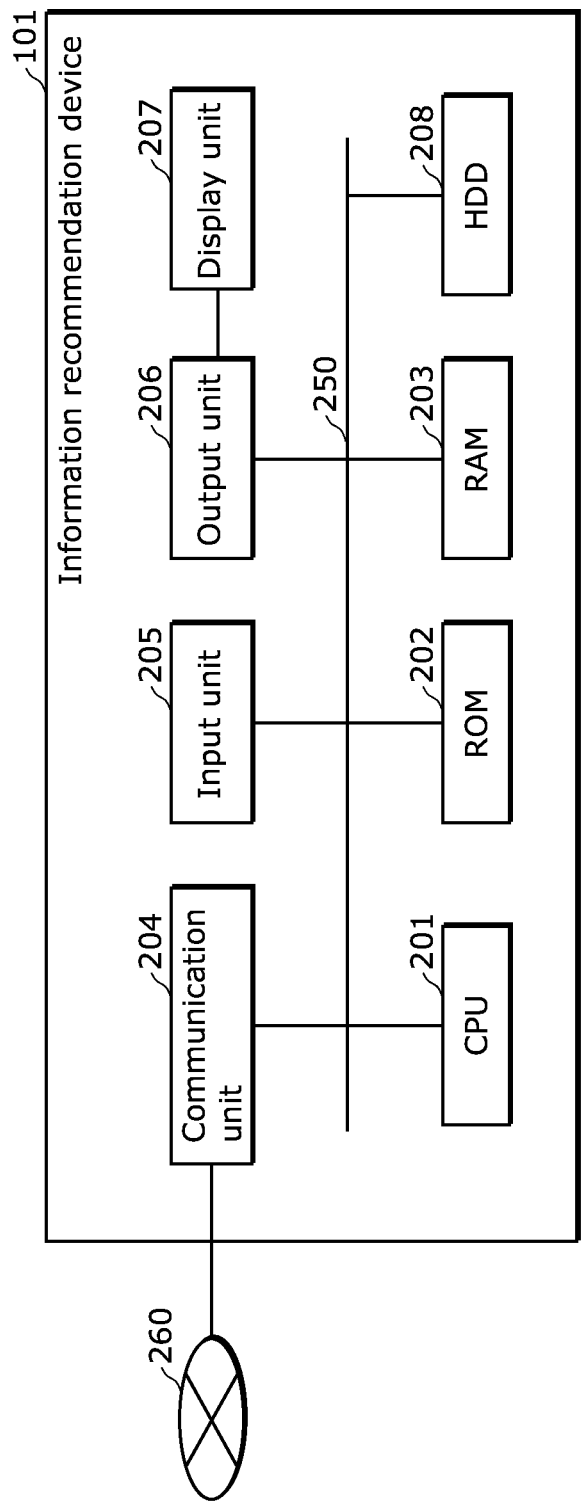
FIG. 2 is a hardware block diagram illustrating major hardware configuration of the information recommendation device.

FIG. 2 is a hardware block diagram illustrating major hardware configuration of the information recommendation device 101.

As shown in FIG. 2, the information recommendation device 101 includes a central processing unit (CPU) 201, a read only memory (ROM) 202, a random access memory (RAM) 203, a communication unit 204, an input unit 205, an output unit 206, a hard disk drive (HDD) 208, and a bus line 250.

The CPU 201 is connected to the bus line 250. The CPU 201 provides various functions by executing a program stored in the ROM 202, RAM 203, or HDD 208, and controlling the ROM 202, RAM 203, communication unit 204, input unit

205, output unit 206, or HDD 208. An example of the various functions includes a function to determine and transmit a recommended program to a communication network 260.

The ROM 202 is connected to the bus line 250. The ROM 202 stores (i) a program which regulates the operation of the CPU 201 and (ii) data used by the CPU 201.

The RAM 203 is connected to the bus line 250. The RAM 203 temporarily stores the data which occurs through the execution of the program by the CPU 201 and the data, etc. received or to be transmitted by the communication unit 204.

The output unit 206 is connected to the bus line 250 and the display (display unit) 207. The output unit 206 is controlled by the CPU 201, and outputs data for causing the display (display unit) 207 to display texts and images.

The input unit 205 is connected to the bus line 250. The input unit 205 is controlled by the CPU 201, and has a function to accept the operational command from the user and transmit the accepted operational command to the CPU 201.

The communication unit 204 is connected to the bus line 250 and the network 260. The communication unit 204 is controlled by the CPU 201, and has a function to transmit and receive data to and from an external communication apparatus via the communication network 260.

The HDD 208 is connected to the bus line 250. The HDD 208 has functions to write data into its hard disk and to read the data written on the hard disk, store the data which occurs through the execution of the program by the CPU 201, and store the data, etc. received or to be transmitted by the communication unit 204.

Here, the communication network 260 is formed of an optical communication line, phone line, a wireless line, or the like, and is connected to an external communication apparatus, the Internet, and so on.

The information recommendation device 101 which is provided by the above hardware provides various functions by executing the program stored in the ROM 202 or the RAM 203 and controlling the ROM 202, the RAM 203, the communication unit 204, the input unit 205, the output unit 206, or the HDD 208, by the CPU 201.

The function structure of the information recommendation device 101 shall be described with reference to the Drawings.

Figure 3:
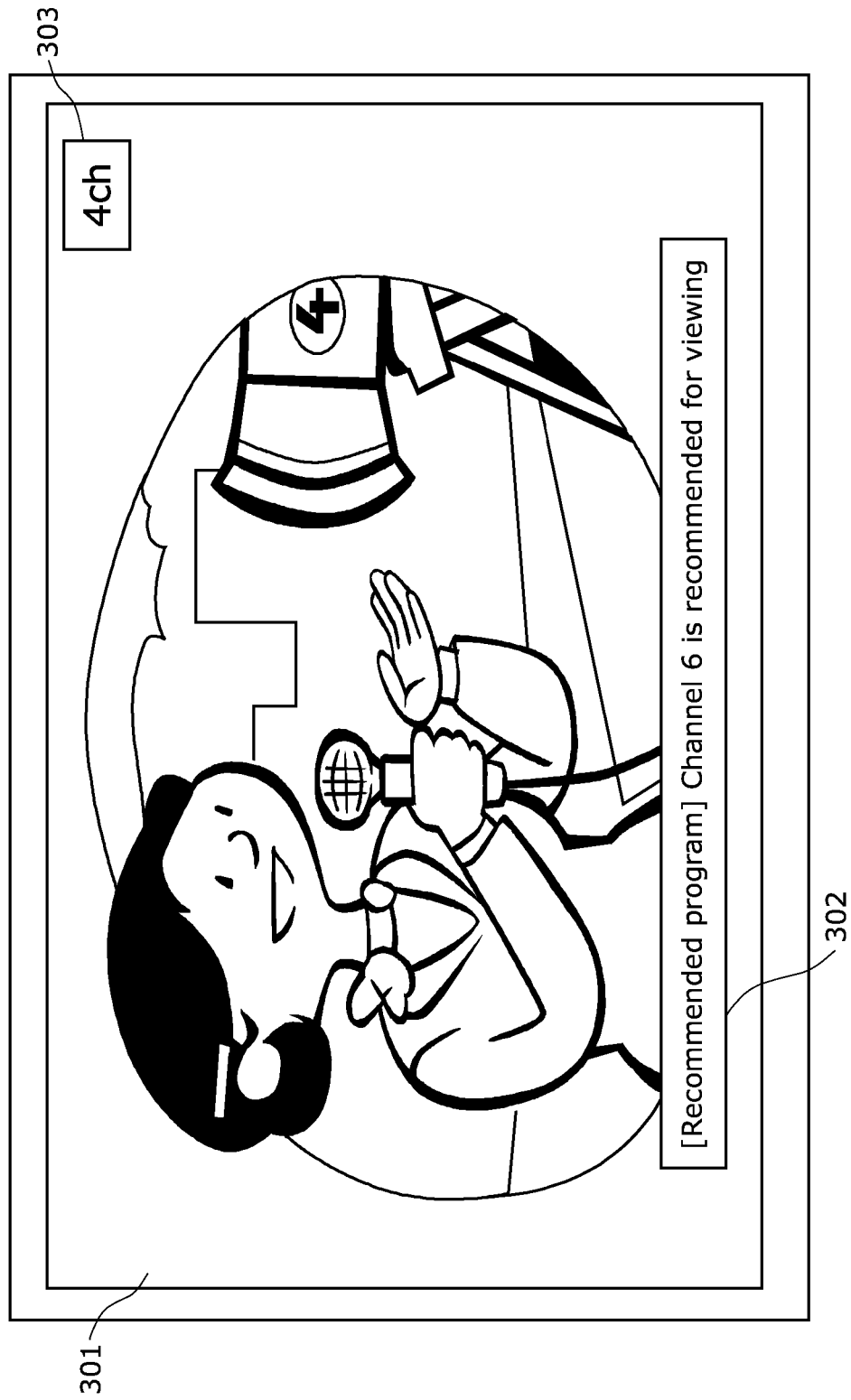
FIG. 3 is a diagram illustrating an example of screen on which a program recommendation provided by the information recommendation device is displayed.

FIG. 3 is an example of the display screen of the TV 102, when the recommendation on a program provided by the information recommendation device 101 is displayed by the TV 102.

FIG. 3 presents a state in which a TV program 301 is being viewed, and a channel 303 currently being viewed may be displayed in the upper right portion, for example. FIG. 3 shows a case in which the information recommendation device 101 determines, when a channel 4 is being viewed, that a channel 6 which is different from the channel 4 is recommended. In this case, the recommended program can be informed to the user by (i) transmission of the information on the recommended program by information recommendation device 101 to the TV 102 and (ii) display of the information on the recommended program as a message 302 by the TV 102. In this state, it is further possible to switch the viewing channel of the TV 102 to the channel 6 through selection of the message 302 by the user.

Figure 4:
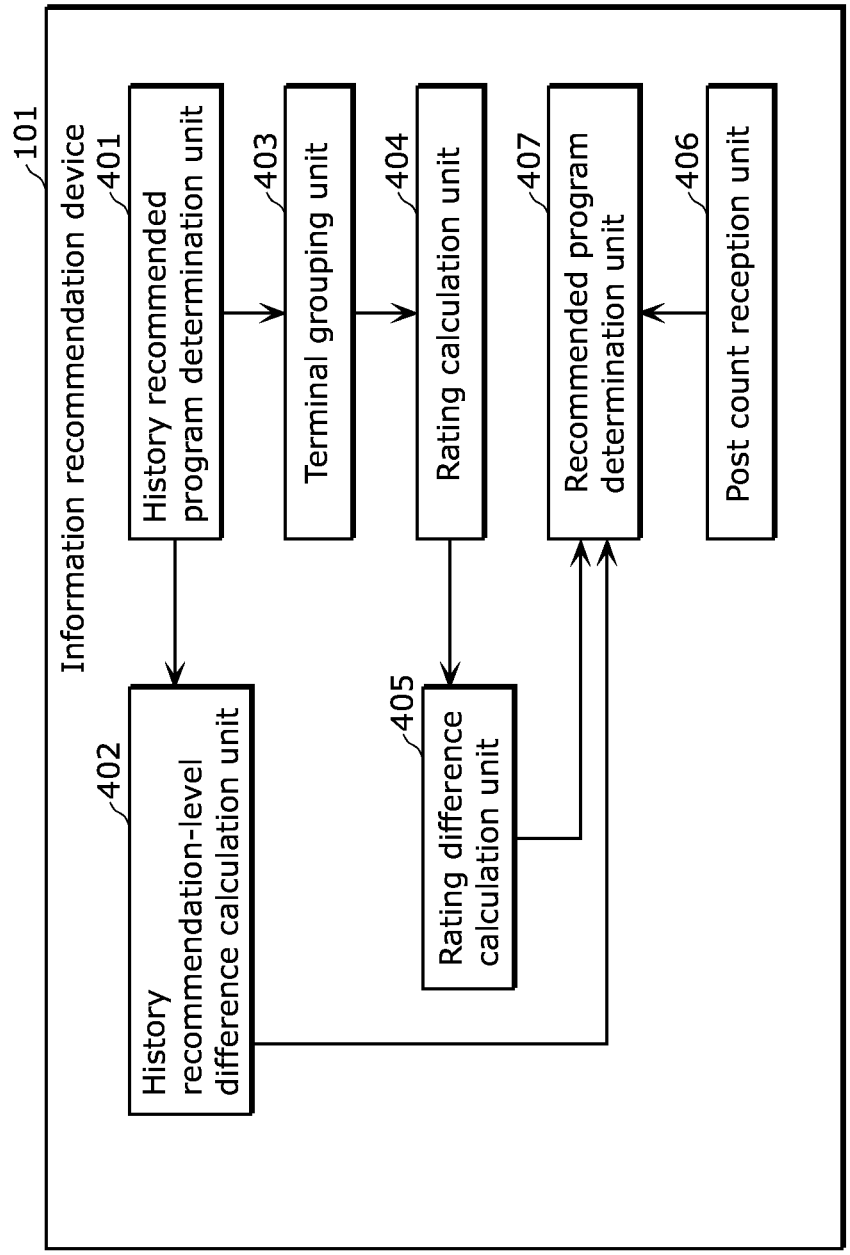
FIG. 4 is a function block diagram illustrating Example of major functional block configuration of the information recommendation device.

FIG. 4 is a function block diagram illustrating Example 1 of major functional blocks of the information recommendation device 101. As shown in FIG. 4, the information recommendation device 101 includes a history recommended program determination unit 401, a history recommendation-level difference calculation unit 402, a terminal grouping unit 403, a rating calculation unit 404, a rating difference calculation unit 405, a post count reception unit 406, and a recommended program determination unit 407.

The history recommended program determination unit 401 determines, from the viewing history and the terminal ID transmitted from the TV 102, etc., a recommended program for the terminal (TV 102, etc.). It is to be noted that the algorism for use in recommended program determination can be realized by a conventional technique (the technique disclosed in PTL 1, for example).

The history recommendation-level difference calculation unit 402 calculates a difference in the recommendation level among plural recommended programs determined by the history recommended program determination unit 401. The history recommendation-level difference calculation unit 402 calculates the difference in recommendation level using the keyword matching count between a keyword for program information of each of the recommended programs and a keyword on individual's preference information, for example.

The terminal grouping unit 403 groups terminals which have the same recommended program into a single group, using the recommended program determined by the history recommended program determination unit 401.

The rating calculation unit 404 calculates the rating of the program from the viewing channel information transmitted from the TV 102, etc. The rating is a viewer rate of a program. It is not necessary for the rating calculation unit 404 to cause the TV 102 to directly transmit the viewing channel information in order to obtain the rating. In other words, for example, the rating calculation unit 404 may obtain the rating calculated by other means (the rating calculated by a research company, for example). Furthermore, the rating calculation unit 404 may calculate the rating for each group grouped by the terminal grouping unit 403 by one of the terminals in the group, instead of calculating the rating from all of the viewing channel information.

The rating difference calculation unit 405 calculates the difference in the rating among plural programs calculated by the rating calculation unit 404. The difference in the rating among the plural programs can be calculated by subtracting the ratings from each other, for example.

The post count reception unit 406 receives the number of comments which is the number of comments (posts) related to the program in a server on the Internet transmitted from the PC 104, the server 105, and so on. The post count here indicates the number of posts on the server within a predetermined time period (one minute, for example).

The recommended program determination unit 407 determines the recommended program from information on the program held by each of the history recommendation-level calculation unit 402, the rating difference calculation unit 405, and the post count reception unit 406.

[1-2. Operation]

Figure 5:
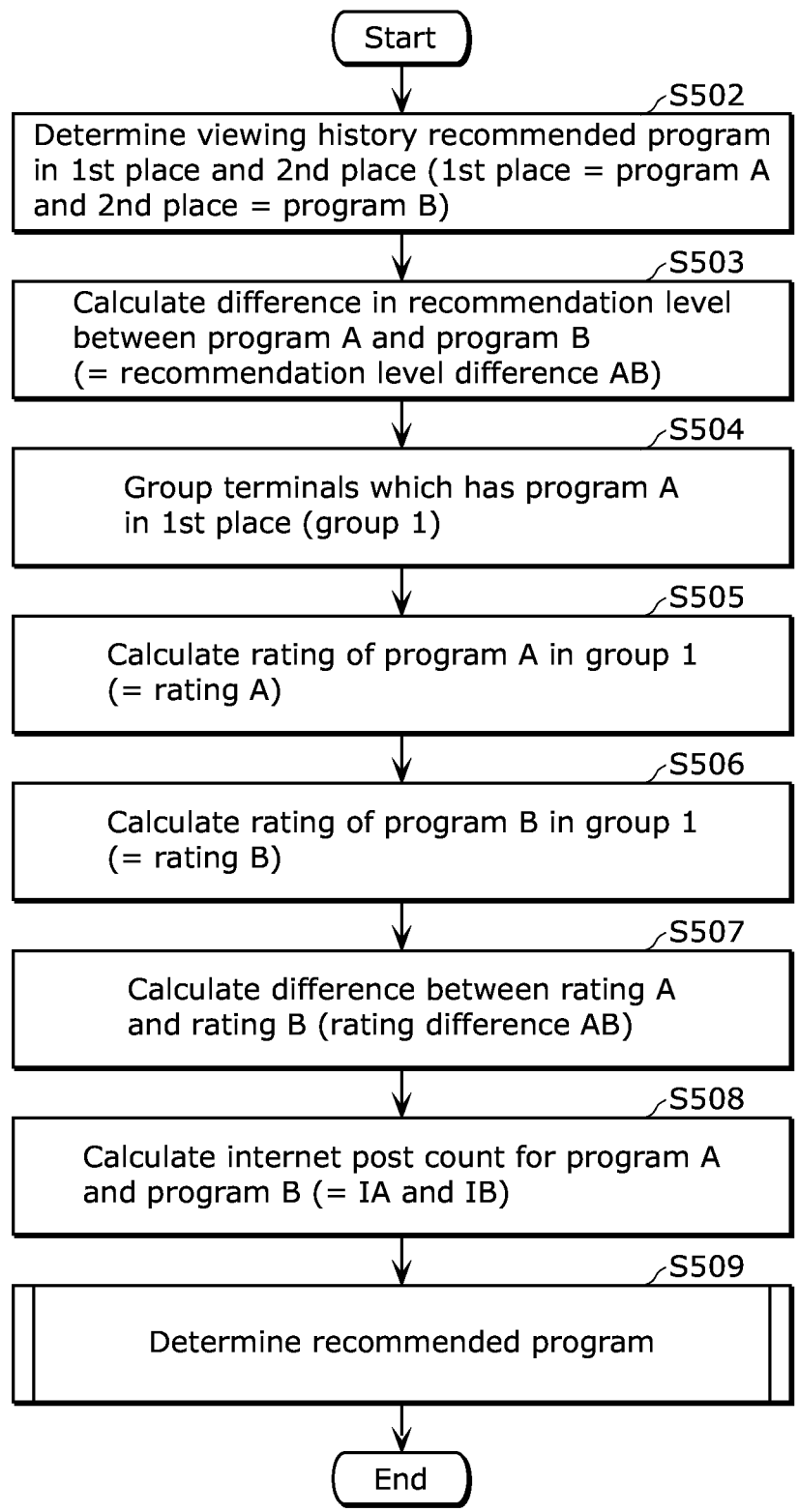
FIG. 5 is a flow chart illustrating an algorithm of the information recommendation device.

FIG. 5 is a flow chart illustrating an algorithm of the information recommendation device 101.

In S502, the history recommended program determination unit 401 determines the viewing history recommended program in the first place and the second place. Here, the program determined as the viewing history recommended program in the first place is denoted as a program A, and the program determined as that in the second place is denoted as a program B.

In S503, the history recommendation-level calculation unit 402 calculates the difference in the recommendation level between the program A and the program B. The difference is denoted as a recommendation level difference AB. The recommendation level difference can be calculated by comparing the keyword matching count between the keyword for program information on each of the recommended programs and the keyword on individual's preference information, for example. The keyword includes names of casts in the program, genre of the program, type of sport, or the like, which characterize the program. The program information includes a keyword for characterizing the program (keyword indicating the characteristics of the program). The individual's preference information stores a keyword indicating what the individual likes. As an example, when (i) the keyword matching count is 5 between the keywords for the program information of the program A and the keywords for the individual's preference information and (ii) the keyword matching count is 3 between the keywords for the program information of the program B and the keywords for the individual's preference information, the history recommendation-level calculation unit 402 calculates the difference in the recommendation level as 5−3=2. Furthermore, the history recommendation-level calculation unit 402 converts the recommendation level difference into a rate to all the matching keywords, and calculates the value of recommendation level difference AB as 2/(5+3)=0.25.

Here, (i) the information indicating the program A and the program B and (ii) the information on the recommendation level difference correspond to the first evaluation value.

In S504, the terminal grouping unit 403 groups the terminals based on trend in the viewing history recommended program. Specifically, the terminal grouping unit 403 groups the terminals whose the viewing history recommended programs in the first place are determined as the program A into a group 1. Here, the terminal grouping unit 403 may group the terminals whose the viewing history recommended programs in the first place and the second places are the same.

In S505, the rating calculation unit 404 calculates the rating of the program A in the group 1, and defines the calculated rating as a rating A. The rating A is calculated by dividing the number of terminals whose viewing channels are the channels of program A by the number of all the terminals which belong to the group 1, based on the viewing channel information transmitted from the terminals which belong to the group 1.

In S506, the rating calculation unit 404 calculates the rating of the program B in the group 1 and defines the calculated rating as a rating B. The rating B is calculated in the same manner as the rating A.

In S507, the rating difference calculation unit 405 calculates the difference between the rating A and the rating B, and defines the calculated difference as a rating difference AB.

In S508, the post count obtainment unit calculates the internet post count for each of the program A and the program B, and defines the calculated post count as IA and IB.

In S509, the recommended program determination unit 407 determines the recommended program based on the information of the recommendation level difference AB, group 1, rating A, rating B, rating difference AB, internet post count IA, and internet post count IB. The details of algorism for use in the recommended program determination shall be described later. The information of the recommendation level difference AB, group 1, rating A, rating B, rating difference AB, internet post count IA, and internet post count IB correspond to the second evaluation value. The second evaluation value is information on which the reaction of public toward the content is reflected. Here, the public indicates a group including the user of the information recommendation device 101 and someone who may know the information related to the content. Here, specific examples of the reaction toward the content include reaction of (i) viewing a content, (ii) viewing a content and posting reviews on the content on a website, etc., and (iii) posting information relevant to the content into a website, etc. regardless of viewing the content or not.

After the above processing, the algorism is finished.

Figure 6:
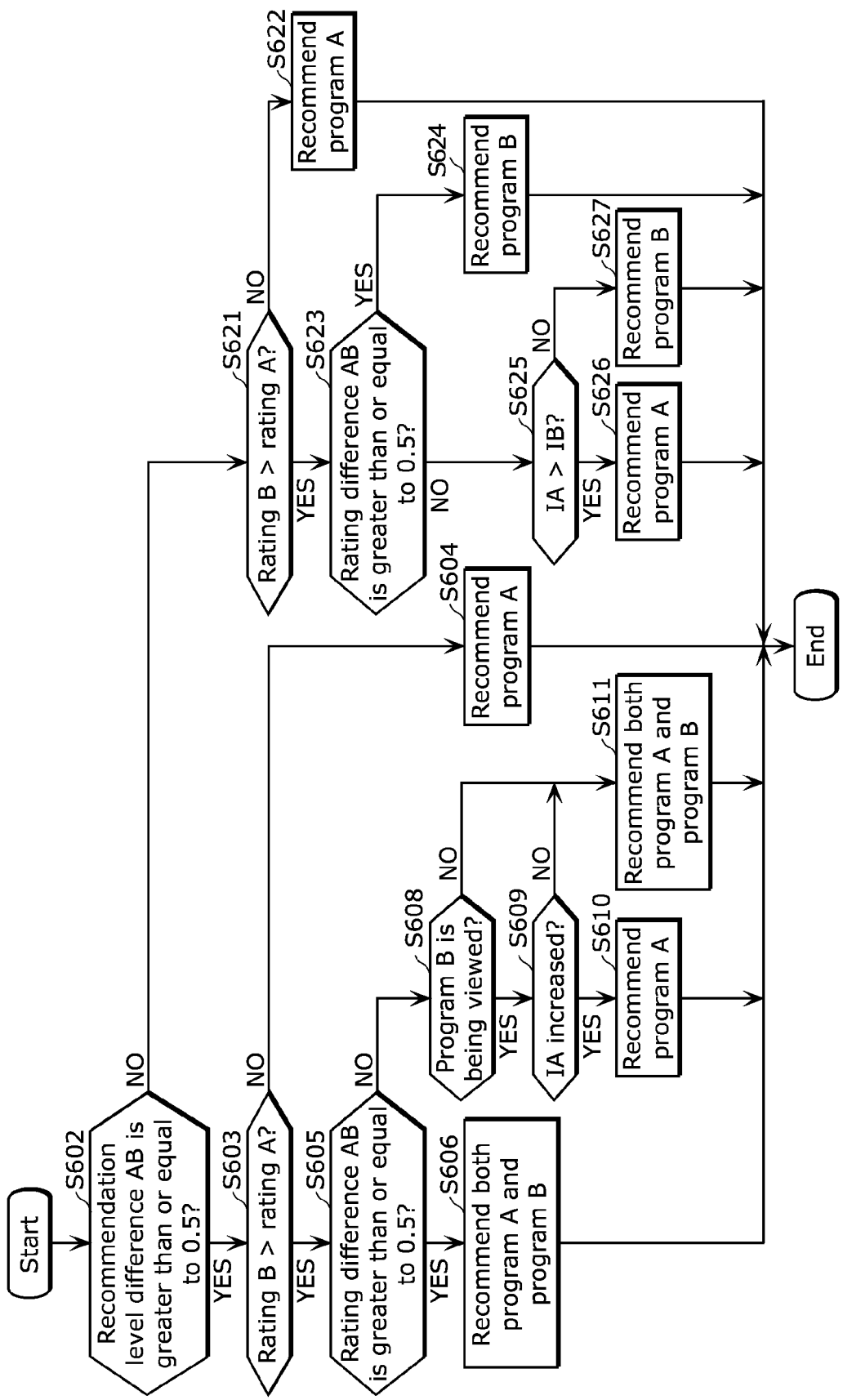
FIG. 6 is a flow chart illustrating an algorithm for use in recommended program determination performed by the information recommendation device.

FIG. 6 is a flowchart illustrating the detailed algorism for use in the recommended program determination (S509 in FIG. 5) performed by the information recommendation device 101 (recommended program determination unit 407).

In S602, the recommended program determination unit 407 determines whether or not the recommendation level difference AB is greater than or equal to a threshold (first threshold). It is assumed that the threshold is, for example, 0.5. However, 0.5 is a mere example for determining whether or not the recommendation level difference between the program A and the program B is great, and thus a different value may be used.

When it is determined YES in S602, the recommended program determination unit 407 determines whether or not the rating B is greater than the rating A in S603.

When it is determined NO in S603, the recommended program determination unit 407 determines the program A as the recommended program in S604, and finishes the algorism. This is because the program A is in the first place in both the rating and the viewing history recommendation level and thus the recommended program determination unit 407 determines it is reasonable to recommend the program A directly.

When it is determined YES in S603, the recommended program determination unit 407 determines whether or not the rating difference AB is greater than or equal to a threshold (second threshold) in S605. It is assumed that the threshold is, for example, 0.5. However, 0.5 is a mere example for determining whether or not the rating level difference between the program A and the program B is great, and thus a different value may be used.

When it is determined YES in S605, the recommended program determination unit 407 determines both the program A and the program B as the final recommended program in S606, and finishes the algorism. This is because both the viewing history recommendation level difference and the rating difference are great and thus the recommended program determination unit 407 determines that it is reasonable to recommend both of the programs.

When it is determined NO in S605, the processing proceeds to S608.

In S608, determination is made on whether or not the user is viewing the program B.

When it is determined NO in S608, the recommended program determination unit 407 determines both the program A and the program B as the final recommended program in S611, and finishes the algorism. This is because the rating difference is small and thus the recommended program determination unit 407 determines that it is reasonable to recommend both the program A and the program B.

When it is determined YES in S608, the recommended program determination unit 407 determines whether or not the internet post count IA has increased, in S609.

When it is determined NO in S609, the recommended program determination unit 407 determines both the program A and the program B as the final recommended program in S611, and finishes the algorism. This is because the rating difference is small and the recommended program determination unit 407 determines that it is reasonable to recommend both the program A and the program B.

When it is determined YES in S609, the recommended program determination unit 407 determines the program A as the final recommended program in S610, and finishes the algorism. This is because the recommended program determination unit 407 determines for the user viewing the program B, which has the viewing history recommendation level in the second place, that it is reasonable to recommend the program A when the number of posts related to the program A on the Internet increases, that is when the program A is gathering more attention.

When it is determined NO in S602, the recommended program determination unit 407 determines whether or not the rating B is greater than the rating A, in S621.

When it is determined NO in S621, the recommended program determination unit 407 determines the program A as the recommended program in S622, and finishes the algorism. This is because the program A is in the first place in both the rating and the viewing history recommendation level, the recommended program determination unit 407 determines that it is reasonable to recommend the program A directly.

When it is determined YES in S621, the recommended program determination unit 407 determines whether or not the rating difference AB is greater than or equal to the threshold, in S623. It is assumed that the threshold is, for example, 0.5. However, 0.5 is a mere example for determining whether or not the rating difference between the program A and the program B is great, and thus a different value may be used.

When it is determined YES in S623, the recommended program determination unit 407 determines the program B as the recommended program in S624, and finishes the algorism. This is because, although the viewing history recommendation level difference is minor the rating difference is great between the program A and the program B, the recommended program determination unit 407 determines that it is reasonable to recommend program B only.

When it is determined NO in S623, the recommended program determination unit 407 determines whether or not the internet post count IA is greater than the internet post count IB in S625.

When it is determined YES in S625, the recommended program determination unit 407 determines the program A as the recommended program in S615, and finishes the algorism. This is because, although the program A has the viewing history recommendation level in the first place and the program B has the rating in the first place, the differences are minor and the recommended program determination unit 407 determines that it is reasonable to recommend the program A by making the determination based on the internet post count.

When it is determined NO in S625, the recommended program determination unit 407 determines the program B as the recommended program in S616, and finishes the algorism. This is because, although the program A has the viewing history recommendation level in the first place and the program B has the rating in the first place, the differences are minor and the recommended program determination unit 407 determines that it is reasonable to recommend the program B by making the determination based on the internet post count.

It is to be noted that the processing shown in FIG. 5 and FIG. 6 may be executed repeatedly while the program is being broadcasted. This allows providing program recommendation on which the rating at a time when the processing is executed, the viewing status of the program by the user, or the internet post count is reflected. Particularly, information such as the rating, the viewing status of the program by the user, or the internet post count changes in the broadcast time as the program proceeds. Thus, executing the processing repeatedly allows providing recommendation in real time.

In the case of recommending both the program A and the program B, if one of the program A and the program B is already being viewed, it is an option to recommend only the program which is not being viewed. This is because it is redundant to recommend the program being watched. In this case, it is an option to display the recommendation in a manner that the user understands not only the program he/she is watching but also the program he/she is not watching is recommendable. An example of this is: "The program B is "also" recommended."

Specific examples of the program recommendation shall be described with reference to FIG. 7 to FIG. 13.

FIG. 7 to FIG. 13 show specific program recommendation information on the program A and the program B.

For example, when the viewing-history-recommendation keyword matching count, the rating, and the internet post count are as shown in FIG. 7, the recommended program determination unit 407 determines to recommend the program A, in S604 in the flow of FIG. 6. This is because it is determined YES in S602 and it is determined NO in S603, in the flow of FIG. 6.

For example, when the viewing-history-recommendation keyword matching count, the rating, and the internet post count are as shown in FIG. 8, the recommended program determination unit 407 determines to recommend both the program A and the program B, in S606 in the flow of FIG. 6. This is because it is determined YES in S602, it is determined YES in S603, and it is determined YES in S605, in the flow of FIG. 6.

For example, when (i) the viewing-history-recommendation keyword matching count, the rating, and the internet post count are as shown in FIG. 9 and (ii) the user is not viewing the program B or the internet post count IA of the program A does not increase, the recommended program determination unit 407 determines to recommend both the program A and the program B, in S611 in the flow of FIG. 6. This is because it is determined YES in S602, it is determined YES in S603, it is determined NO in S605, and it is determined NO in S608 or S609, in the flow of FIG. 6.

Furthermore, when (i) this state changes to a state where the user is viewing the program B and (ii) the internet post count IA of the program A increases, the recommended program determination unit 407 determines to recommend the program A, in S610 in the flow of FIG. 6. This is because it is determined YES in S602, it is determined YES in S603, it is determined NO in S605, it is determined YES in S608, and it is determined YES in S609, in the flow of FIG. 6.

It is to be noted that when determining whether or not the internet post count IA has increased in S609, a threshold may be set. In other words, it may be set that it is determined YES in S609 when the internet post count IA increased by the threshold or more.

For example, when the viewing-history-recommendation keyword matching count, the rating, and the internet post count are as shown in FIG. 10, the recommended program determination unit 407 determines to recommend the program A, in S604 in the flow of FIG. 6. This is because it is determined NO in S602, and it is determined NO in S621, in the flow of FIG. 6.

For example, when the viewing-history-recommendation keyword matching count, the rating, and the internet post count are as shown in FIG. 11, the recommended program determination unit 407 determines to recommend the program A, in S626 in the flow of FIG. 6. This is because it is determined NO in S602, it is determined YES in S621, it is determined NO in S623, and it is determined YES in S625, in the flow of FIG. 6.

For example, when the viewing-history-recommendation keyword matching count, the rating, and the internet post count are as shown in FIG. 12, the recommended program determination unit 407 determines to recommend the program B, in S627 in the flow of FIG. 6. This is because it is determined NO in S602, it is determined YES in S621, it is determined NO in S623, and it is determined NO in S625, in the flow of FIG. 6.

Figures 13, 14:
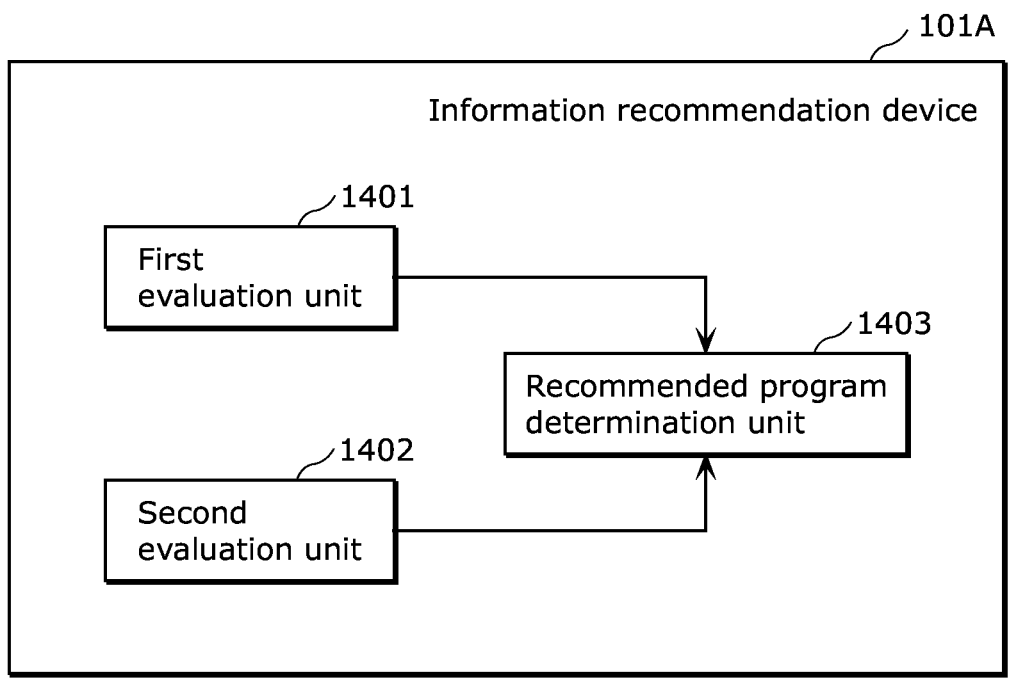
FIG. 13 illustrates Example 7 of the program recommendation.
FIG. 14 is a function block diagram illustrating Example 2 of functional block configuration of the information recommendation device.

For example, when the viewing-history-recommendation keyword matching count, the rating, and the internet post count are as shown in FIG. 13, the recommended program determination unit 407 determines to recommend the program B, in S624 in the flow of FIG. 6. This is because it is determined NO in S602, it is determined YES in S621, and it is determined YES in S623, in the flow of FIG. 6.

Constituent elements necessary for the present disclosure shall be described with reference to FIG. 14.

FIG. 14 is a function block diagram illustrating Example 2 of the function block configuration of the information recommendation device (information recommendation device 101A).

As shown in FIG. 14, the information recommendation device 101A includes a first evaluation unit 1401, a second evaluation unit 1402, and a recommended program determination unit 1403.

The first evaluation unit 1401 calculates, for each of plural content items being broadcasted, the first evaluation value defined depending on the user. It is to be noted that the first evaluation unit 1401 corresponds to the history recommended program determination unit 401 and the history recommendation-level difference calculation unit 402 in FIG. 4.

The second evaluation unit 1402 calculates, for each of the content items included in the plural content items, the second evaluation value defined based on the current reaction of the public toward the content items. It is to be noted that the second evaluation unit 1402 corresponds to the terminal grouping unit 403, the rating calculation unit 404, the rating difference calculation unit 405, and the post count reception unit 406.

The recommended program determination unit 1403 determines the recommend content item, which is the content item recommended to the user for viewing, based on the first evaluation value calculated by the first evaluation unit and the second evaluation value calculated by the second evaluation unit. It is to be noted that the recommended program determination unit 1403 corresponds to the recommended program determination unit 407 in FIG. 4.

With the information recommendation device 101 according to the present embodiment, it is possible to provide optimal program recommendation taking into account the user's preference information and the current viewing status.

Furthermore, the recommended content item (program) to the user can be determined based on the first evaluation value and the second evaluation value. If the recommended content item is to be determined based only on the first evaluation value defined from the information related to the user, a correct recommended content item cannot be determined in the case where the scheduled broadcast time of the content item is changed. Since the second evaluation value is also used in the present disclosure, the recommended content item can be determined correctly even when the scheduled broadcast time of the content item is changed. The second evaluation value is the value obtained taking into account the current reaction of public toward the content item.

In addition, even when there is no change in the broadcast time of the content item, the viewing status varies in the broadcast time depending on the broadcast content. In the present disclosure, the information dependent on the current viewing status of the viewer who is actually viewing the content item is used, which allows correctly determining the recommended content item. Thus, the information recommendation device can determine, in real time, the content item recommended to the user for viewing (recommended content item).

Furthermore, the information recommendation device uses, as the information defined depending on the user, information indicating the user's preference or information on the user's past viewing history. Then, the information recommendation device calculates the first evaluation value by comparing these information with information indicating the characteristics of the content item. Thus, it is possible to determine a recommended content item on which the user's preference is reflected more or a recommended content item which is closer to the user's viewing history.

Furthermore, the information recommendation device selects two or more of the content items based on the first evaluation value (the content item having the highest first evaluation value and the content item having the next highest first evaluation value, for example), and calculates the second evaluation value for the two or more content items. The second evaluation value is greater as the user and a large number of other viewers are viewing the content item. Thus, it is possible to determine, as the recommended content item, the content item being viewed by the greater number of viewers out of the recommended content items on which the user's preference are reflected more or the recommended content items which are closer to the user's viewing history.

It is possible to specifically determine, in real time, a content item recommended to the user for viewing (recommended content item) using the first evaluation value and the second evaluation value.

Furthermore, the recommended content item can be determined taking into account the number of posts (post count) on the Internet. The internet post count varies drastically in the broadcast time depending on the broadcast content. The use of variation in the internet post count allows determining the recommended content item in real time.

This allows more specifically determining, in real time, the content item recommended to the user for viewing (recommended content item) using the first evaluation value, the second evaluation value, and the internet post count.

Other Embodiments

The foregoing has described an embodiment, as an example of the technique disclosed in the present application. However, the technique in the present disclosure is not limited to the above, and may be applied to embodiments obtained by modifying, replacing, adding, and omitting the above embodiments as appropriate. It is also possible to combine each of the constituent elements described in the above embodiment to make a new embodiment.

<Supplemental Explanation>

Although the above has described an embodiment of the information recommendation device according to the present disclosure, modification as described below is also possible and the present disclosure is not limited to the information recommendation device as described in the above embodiment.

(1) In the embodiment, not only TV programs but also internet content items can be recommended. The rating for an internet content item can be defined by collecting the collected access count of the internet content item and calculating the rate of the access count to the target internet content items. For example, when the access count of the internet content item A is 600 and the access count of the internet content item B is 400, the rating of internet content item A is 0.6 (=600/(600+400)). It is to be noted that the rating of the internet content item may also be calculated using various indices related to the internet content item, instead of the access count. The various indices may include the number of purchases of internet content items, the number of downloads of internet content items, and so on.

(2) Although the recommended program was determined based on whether the internet post count is great or small in the embodiment, the determination on the recommend program may be made by analyzing the content of the post, instead of the post count. For example, a program with a post including a specific keyword such as "interesting", or a program with more posts including such specific keywords may be recommended.

(3) In the embodiment, the recommendation based on the viewing history reflects individual's preference. The individual's preference does not vary in a short term, and it is believed to be stable for a certain long term even though it varies gradually in the long term. Accordingly, the evaluation on the program and the content based on the individual's preference can be regarded as a static evaluation on the program and the content. Here, the static evaluation on the program and the content is not limited to that based on the keyword matching count described in the embodiment. For example, the static evaluation on the program and the content may be made based on information indicating individual attribution such as the age, marital status, family configuration, occupation, hobby, and so on.

In contrast, the evaluation on the program and content based on the rating and the internet post count can be regarded as a dynamic evaluation on the program and content. It is predicted that further progress of the network society in the future will allow the dynamic evaluation on the program and content to be made based on a wider variety of information.

(4) In the embodiment, the recommendation based on the viewing history is the recommendation on which the individual's preference is reflected, and the evaluation on the program and content based on the rating and the internet post count is the evaluation on which the preference of the third person other than the individual is reflected. This indicates that the present disclosure can be regarded not only as a disclosure for determining a recommend program based on the static evaluation and the dynamic evaluation as in (3) above, but also as a disclosure for determining a recommended program based on the individual's evaluation and the third person's evaluation. Here, the third person may by someone who belongs to a group having certain relationship with the individual, or a person who has no relationship with the individual.

(5) In the embodiment, all of the viewing-history-recommendation keyword matching count, the rating, and the internet post count in the first place and the second place were compared. However, this does not mean that the comparison is limited to be performed on those in the first place and the second place. The recommend program may be determined by comparing those in the first and second places and then comparing those in the second and third places.

(6) In the embodiment, the information recommendation device which receives information from TV was described. However, the information recommendation device may be included in the TV.

The foregoing has described the embodiment as an example of the technique disclosed in the present application. The attached Drawings and Specification are provided for supporting the embodiment.

Accordingly, the constituent elements seen in the Drawings and Specification may include not only constituent elements necessary for solving the problem but also some constituent elements which are not necessary for solving the problem in order to exemplify the above technique. Therefore, even when some unnecessary constituent elements are seen in the attached Drawings or Specification, it should not be acknowledged immediately that the unnecessary constituent elements are necessary.

Furthermore, the above embodiments are raised to exemplify the technique according to the present disclosure. Therefore, various modification, replacement, addition, and omission may be made within or equivalent to the scope of the Claims.

Although only an exemplary embodiment of the present disclosure has been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The information recommendation device according to the present disclosure can be applied to a variety of apparatuses having recommended content (program) informing function.

The invention claimed is:

1. An information recommendation device comprising a computer including a CPU and a non-transitory memory storing a control program,
   wherein the control program, when executed by the CPU, causes the computer to perform:
      calculating, for each of a plurality of content items being broadcasted, a first evaluation value which is defined depending on a user, the first evaluation value being calculated, for each of the content items, to be greater, as relevance between the content item and a preference of the user or a past viewing history of the user is higher;
      calculating, for each of the content items, a second evaluation value which is defined based on a current reaction of public toward the content item;
      determining a recommended content item based on the first evaluation value and the second evaluation value, the recommended content item being a content item recommended to the user for viewing; and
      outputting the determined recommended content item for displaying on a display,
   the control program further causes the computer to perform, in the calculating the second evaluation value:
      calculating the second evaluation value by using a current viewing status toward the content item as the reaction;
      selecting two or more of the content items based on the first evaluation value; and
      calculating the second evaluation value, for each of the two or more of the content items, to be greater, as the number of viewers of the content item is greater, and
   the control program further causes the computer to perform, in the determining a recommended content item:
      when (i) the first evaluation value for a first broadcasting program is greater than, by a first threshold or more, the first evaluation value for a second broadcasting program, and (ii) the second evaluation value for the second broadcasting program is not greater than the second evaluation value for the first broadcasting program, determining the first broadcasting program as the recommended content item, the first broadcasting program and the second broadcasting program being included in the plurality of content items and being different from each other.

2. The information recommendation device according to claim 1, wherein:

the control program, when executed by the CPU, further causes the computer to perform obtaining the number of posts posted to a server on the Internet related to the content items being broadcasted, and the recommended content item is determined based on the first evaluation value, the second evaluation value, and the post count.

3. The information recommendation device according to claim 2, wherein, when (i) the first evaluation value for the first broadcasting program is not greater than, by the first threshold or more, the first evaluation value for the second broadcasting program, (ii) the second evaluation value for the second program is not greater than, by a second threshold or more, the second evaluation value for the first broadcasting program, and (iii) the post count of posts related to the first broadcasting program while the first broadcasting program is broadcasted is not greater than the post count of posts related to the second broadcasting program while the second broadcasting program is broadcasted, the second broadcasting program is determined as the recommended content item, the first broadcasting program and the second broadcasting program being included in the plurality of content items and being different from each other.

4. An information recommendation system comprising:
the information recommendation device according to claim 1; and
a content display terminal which displays a content item and transmits information dependent on a user viewing the content item to the information recommendation device,
wherein the first evaluation value is calculated based on the information dependent on the user and is received from the content display terminal.

5. An information recommendation method comprising:
calculating, by a computer executing a control program, for each of a plurality of content items being broadcasted, a first evaluation value which is defined depending on a user, the first evaluation value being calculated, for each of the content items, to be greater, as relevance between the content item and a preference of the user or a past viewing history of the user is higher;
calculating, by the computer, for each of the content items, a second evaluation value which is defined based on a current reaction of public toward the content item;
determining, by the computer, a recommended content item based on the first evaluation value calculated in the calculating of a first evaluation value and the second evaluation value calculated in the calculating of a second evaluation value, the recommended content item being a content item recommended to the user for viewing; and
outputting the determined recommended content item for displaying on a display, wherein:
the calculating the second evaluation value comprises:
calculating, by the computer, the second evaluation value by using a current viewing status toward the content item as the reaction;
selecting, by the computer, two or more of the content items based on the first evaluation value; and
calculating, by the computer, the second evaluation value, for each of the two or more of the content items, to be greater, as the number of viewers of the content item is greater, and
the determining a recommended content item comprises determining the first broadcasting program as the recommended content item, when (i) the first evaluation value for a first broadcasting program is greater than, by a first threshold or more, the first evaluation value for a second broadcasting program, and (ii) the second evaluation value for the second broadcasting program is not greater than the second evaluation value for the first broadcasting program, the first broadcasting program and the second broadcasting program being included in the plurality of content items and being different from each other.

6. The information recommendation method according to claim 5, further comprising:
obtaining the number of posts posted to a server on the Internet related to the content items being broadcasted,
wherein the recommended content item is determined based on the first evaluation value, the second evaluation value, and the post count.

7. The information recommendation method according to claim 6,
wherein, when (i) the first evaluation value for the first broadcasting program is not greater than, by the first threshold or more, the first evaluation value for the second broadcasting program, (ii) the second evaluation value for the second broadcasting program is not greater than, by a second threshold or more, the second evaluation value for the first broadcasting program, and (iii) the post count of posts related to the first broadcasting program while the first broadcasting program is broadcasted is not greater than the post count of posts related to the second broadcasting program while the second broadcasting program is broadcasted, the second broadcasting program is determined as the recommended content item, the first broadcasting program and the second broadcasting program being included in the plurality of content items and being different from each other.

8. A non-transitory computer-readable recording medium for use in a computer, the recording medium having a computer program recorded thereon, wherein:
wherein the computer program, when executed by a computer, causes the computer to perform:
calculating, for each of a plurality of content items being broadcasted, a first evaluation value which is defined depending on a user, the first evaluation value being calculated, for each of the content items, to be greater, as relevance between the content item and a preference of the user or a past viewing history of the user is higher;
calculating, for each of the content items, a second evaluation value which is defined based on a current reaction of public toward the content item;
determining a recommended content item based on the first evaluation value and the second evaluation value, the recommended content item being a content item recommended to the user for viewing; and
outputting the determined recommended content item for displaying on a display, the calculating the second evaluation value comprises:
calculating, by the computer, the second evaluation value by using a current viewing status toward the content item as the reaction;

selecting, by the computer, two or more of the content items based on the first evaluation value; and calculating, by the computer, the second evaluation value, for each of the two or more of the content items, to be greater, as the number of viewers of the content item is greater, and the determining a recommended content item comprises determining the first broadcasting program as the recommended content item, when (i) the first evaluation value for a first broadcasting program is greater than, by a first threshold or more, the first evaluation value for a second broadcasting program, and (ii) the second evaluation value for the second broadcasting program is not greater than the second evaluation value for the first broadcasting program, the first broadcasting program and the second broadcasting program being included in the plurality of content items and being different from each other.

9. The non-transitory computer-readable recording medium according to claim 8, wherein:

the computer program, when executed by the computer, further causes the computer to perform obtaining the number of posts posted to a server on the Internet related to the content items being broadcasted, wherein the recommended content item is determined based on the first evaluation value, the second evaluation value, and the post count.

10. The transitory computer-readable recording medium according to claim 9, wherein, when (i) the first evaluation value for the first broadcasting program is not greater than, by the first threshold or more, the first evaluation value for the second broadcasting program, (ii) the second evaluation value for the second broadcasting program is not greater than, by a second threshold or more, the second evaluation value for the first broadcasting program, and (iii) the post count of posts related to the first broadcasting program while the first broadcasting program is broadcasted is not greater than the post count of posts related to the second broadcasting program while the second broadcasting program is broadcasted, the second broadcasting program is determined as the recommended content item, the first broadcasting program and the second broadcasting program being included in the plurality of content items and being different from each other.

* * * * *